United States Patent [19]
Rainger
[11] 3,927,250
[45] Dec. 16, 1975

[54] TELEVISION SYSTEM WITH TRANSMISSION OF AUXILIARY INFORMATION

[75] Inventor: Peter Rainger, Pinner, England

[73] Assignee: British Broadcasting Corporation, London, England

[22] Filed: Feb. 11, 1974

[21] Appl. No.: 441,502

[30] Foreign Application Priority Data

Feb. 15, 1973 United Kingdom ................ 7569/73

[52] U.S. Cl. .... 178/5.6; 178/DIG. 13; 178/DIG. 23
[51] Int. Cl.[2] ............................................ H04N 7/00
[58] Field of Search .......... 178/5.6, 5.8 R, DIG. 13, 178/DIG. 23

[56] References Cited

UNITED STATES PATENTS 3,493,674 2/1970 Houghton .......................... 178/5.6

*Primary Examiner*—Robert L. Richardson
*Attorney, Agent, or Firm*—Robert F. O'Connell

[57] ABSTRACT

Digitally encoded data such as stock and other market reports is multiplexed on to a television broadcast signal. In order to allow a lot of pages of data to be transmitted, the pages are transmitted at intervals such as 1-minute intervals. The receiver can be preset to display the data available at any specified time of day on the basis of a schedule of transmission times for different categories of data.

14 Claims, 4 Drawing Figures

TELEVISION SYSTEM WITH TRANSMISSION OF AUXILIARY INFORMATION

This invention relates to systems in which blocks of digitally coded data are multiplexed on to a broadcast television signal and, on reception, are decoded for display superimposed on or in lieu of the picture carried by the signal. The invention concerns improvements at both the transmitting and receiving portions of such systems.

The use of such systems has been proposed as a means of supplementing television transmissions with data transmission containing say weather reports, stock market reports, and so on. To this end a plurality of different data blocks can be multiplexed with each other and with the television signal, each different data block occupying a different time slot. At the receiver, any one time slot can be selected for display of the corresponding data block. The applicants propose to utilize a number of time slots, allowing the transmission of 32 blocks or "pages" of data. These 32 pages find ready use for the following facilities, among others:

2 pages index of contents
4 pages of programme details
2 pages of racing information
2 pages of weather information
5 pages of news
etc., etc.

There are however, various limitations on the amount of data that can be transmitted. A page can, for example, consist of up to 24 lines each with 32 character places. This is insufficient to index the 32 pages and therefore, in the above table, two pages have been allocated to a list of contents. There are other topics which require more than one page to accommodate enough data; the allocation of pages will inevitably be insufficient to cater for all requirements. Furthermore, there are many specialised items of information, of interest only to restricted sections of the community for which it will be completely impossible to allocate separate pages. The object of the present invention is to provide solutions to the problems thus posed.

According to the invention in one aspect there is provided a television transmission system arranged to broadcast a television signal and to multiplex therewith in at least one time slot different blocks of digitally coded data at different times of day, each of which blocks includes a code addressing the block.

According to the invention in another aspect there is provided a television receiver system for receiving a broadcast television signal, comprising means for extracting from a predetermined time slot blocks of digitally coded data multiplexed with the television signal, manually controllable means for presetting a block address representing a selected one of a succession of data blocks all transmitted within the predetermined time slot, means for comparing address codes in the data blocks with the present address, and means operative when a match is detected by the comparing means to cause the corresponding block of data to be displayed and/or stored for subsequent display.

According to the invention in another aspect there is provided a television receiver system for receiving a broadcast television signal having multiplexed therewith in a plurality of time slots blocks of digitally coded data with the data blocks occupying a recurring data block transmitting cycle of $q.p$ fields in which each of $q$ time slots is comprised within a different $p$ of the fields, and one or more predetermined time slots has transmitted therein a succession of different data blocks, all data blocks including a time slot address and each data block in the or each predetermined time slot including a data block address, the system comprising a data block store, means for extracting the data blocks from the television signal, and means for presetting a time slot address and a data block address, and means for gating an extracted data block into the data block store when, in the case of the or each predetermined time slot, there is a match between both the received time slot address and data block address and the preset time slot address and data block address and when, in the case of the remaining time slots, there is a match between only the received time slot address and the preset time slot address.

By means of this invention it is possible, throughout the day, to transmit a very large number of different pages of specialised information; there may be a different page every minute for example, allowing 1440 different pages to be transmitted in one time slot if all 24 hours are used. The user equipped with a suitable receiver can preselect his page and watch his receiver at the time when this is transmitted. Preferably however, the receiver system is arranged automatically to store the addressed block of data and can be left unattended to perform this operation and allow the user to display the stored block of data at a time convenient to him. Since the display device need not be operated when the receiver system is on standby for reception of the data block, power consumption on standby will be minimal.

The transmitted data is digitally encoded, for example in ASCII code. Techniques well known in themselves, and employing commercially available equipment, may then be employed at the receiver system to convert the digitally coded signal into a video signal for display on the screen of the receiver. This display can be superimposed on the normal picture or provision may be made for switching off the normal picture using digital control signals. Alternatively, a small supplementary display screen or printer may be provided, at a location remote from the receiver proper if need be, for displaying the decoded data.

Although the digitally coded data can be multiplexed with the television signal in various ways, without interfering with normal reception of the television signal, it is preferred to insert the data on one or more lines occurring within the vertical blanking interval. Other possibilities are insertion in the horizontal blanking interval and modulation on to a sub-carrier, e.g. an audio sub-carrier. Whatever form of multiplexing is employed there exists a variety of possible ways of defining a time slot. For example, using $m$ lines in the vertical blanking interval, lines $n$ to $n + m$ may be used in fields 1 to $p$ for one time slot; in fields $p + 1$ to $2p$ for the next time slot where $p.m$ is the number of data lines making up a page, and so on on a cyclically recurrent basis, $q.p$ fields being employed, when there are $q$ time slots, in a complete cycle. As defined above the data transmissions for information occupying one time slot are contiguous from field to field until a complete data block, representing a page has been transmitted. A data block is transmitted in $p$ sections, one in each of $p$ consecutive fields. Pages are thus transmitted sequentially, each being completed before transmission of the next.

A different way of defining time slots results in interleaving sections of the data blocks being transmitted, and is the preferred alternative. Taking $m$ television lines in the vertical blanking interval, lines $n$ to $n + m$ may be used as before to send each section of a data block, these $m$ lines are used in every $q$th field for a particular block, the data lines in the intervening $q - 1$ fields carrying data for the other $q - 1$ blocks. A complete cycle again occupies $q.p$ fields but the $p$ sections of data block 1 are transmitted in fields 1, $q + 1$, $2q + 1$ and so on, the $p$ sections of data block 2 are transmitted in fields 2, $q + 2$, $2q + 2$ and so on, and in general the $p$ sections of data block $s$ are transmitted in fields $s$, $s + q$, $s + 2q \ldots s + (p - 1)q$ of the cycle.

Whichever alternative is adopted the invention as defined above can be applied to one or more of the time slots, the receiver system being equipped with means for selecting the required time slot as well as for presetting a data block address within a time slot.

The address codes are conveniently the times of day at which the different data blocks will be transmitted. This makes it easy for the user to know when to switch his equipment on in readiness for reception of his page and can also provide a means of transmitting accurate time checks.

According to the present invention in yet another aspect there is provided a television transmission system arranged to broadcast a television signal and to multiplex therewith in at least one time slot a cyclic succession of data blocks, each of which occupies a transmission time of the order of one minute.

A receiver system set up to display the data received in the particular time slot selected will thus display a cyclic succession of pages, giving sufficient time for each page to be read while not making it too tedious for the viewer to wait for the page to change. This facility may be employed for example for a stock market report for which one page is insufficient. In a few minutes viewing time the user can read a number of pages containing a fairly full report.

An embodiment of the invention will now be described in more detail, by way of example, with reference to the accompanying drawings, in which.

Figure 1:
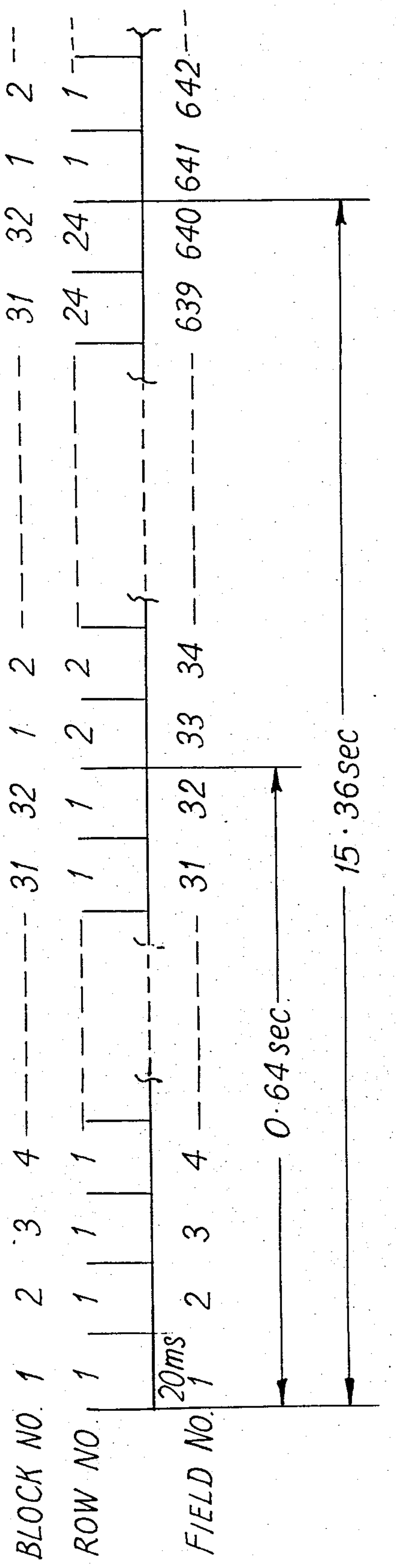
FIG. 1 illustrates a time-division multiplexing scheme for 32 data blocks.

In this embodiment digitally encoded data is transmitted in ASCII code in the form of NRZ pulses superimposed on lines 13 and 14 of the odd fields of a 625 line, 50 field per second television system and on lines 326 and 327 of the even fields. For convenience these lines will be referred to simply as lines 13 and 14. Each such pair of lines carries one line of characters of a data block which consists in all of 24 lines of characters; the line of characters will hereinafter be called rows to distinguish from the television lines. There are 32 data blocks and, using the symbols and terminology established above, $m = 2$, $p = 24$, and $q = 32$ and a section of a data block is one row of characters, i.e. two lines of a field. The 32 data blocks are interlaced row by row and $32 \times 24$ fields are therefore required to transmit all 32 data blocks, occupying a cycle time of $(32 \times 24)/50$ seconds = 15.36 seconds. The multiplexing scheme is illustrated in FIG. 1 of the drawings.

For simplicity it will be assumed that pages 1 to 8 and 10 to 31 are all transmitted as single pages, page 9 consists actually of pages 9*a*, 9*b* and 9*c* which follow in cyclic succession, one every minute while page 32 actually consists of a fresh page every minute.

The facility provided for page 9 will be called cyclic pages and will typically be provided in more than one of the time slots; there may be only two pages in a cycle or more than three pages in a cycle. The facility provided for page 32 will be called multiple pages and may again be provided in more than one of the time slots.

Each row is transmitted as 32 ASCII characters occupying the last half of line 13 and all of line 14. The first half of line 13 is occupied by a fairly long address including two characters defining the page number 1 to 32. Each row 1 includes a special beginning of page code enabling the receiver to correctly assemble the rows of the selected page. Page 32 addresses additionally include four characters defining in 24 hour clock rotation the addresses of the pages transmitted in time slot 32, and also defining the time of transmission. Parity check bits or other error detecting and/or correcting codes may be added to all addresses.

Figure 2:
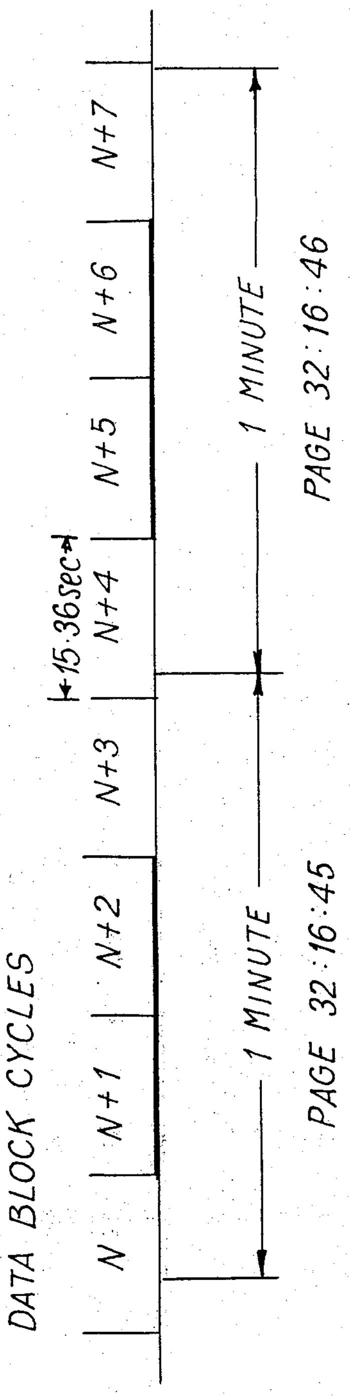
FIG. 2 illustrates the timing of data block cycles for changing a data block every minute.

The 32-page cycle time of 15.36 seconds does not divide exactly into 1 minute. To simplify the treatment of page 32 the scheme illustrated in FIG. 2 is adopted. This shows the data block cycles N,N + 1 etc. occurring during the minutes assigned to page 32:16:45 (i.e. the page transmitted on time slot 32 at 16.45 hours) and to page 32:16:46. A page 32 data block is only transmitted in the first two complete block cycles occurring within the minute in question. There are always two complete cycles, e.g. as in the case of page 32:16:46 where cycles N + 5 and N + 6 are complete although neither N + 4 nor N + 7 is complete. Two cycles, rather than one, are used to improve the security of reception. The heavy lines indicate the cycles in which transmission is effected.

Figure 3:
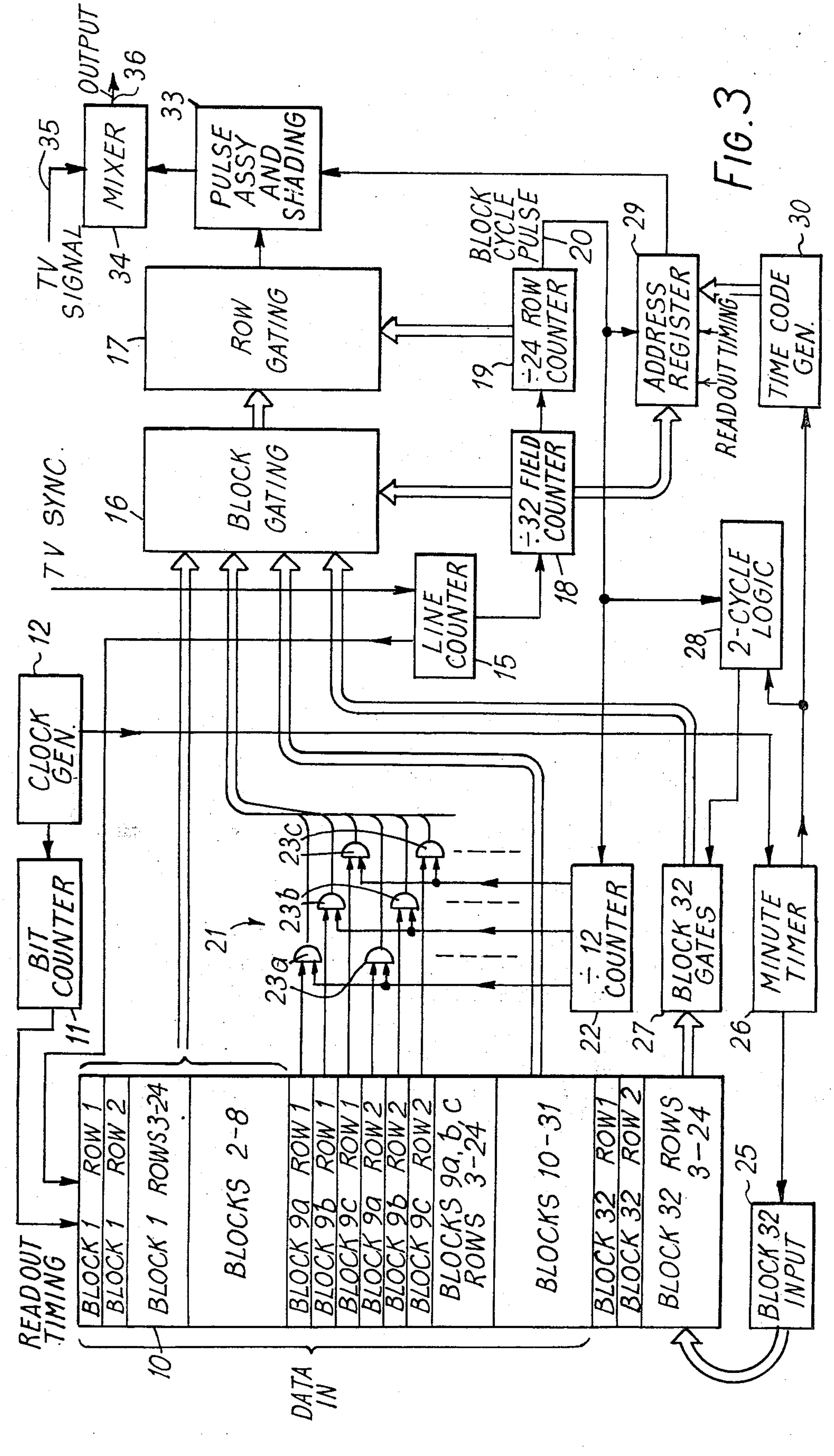
FIG. 3 is a block diagram of a transmitter system, and, FIG. 4 is a block diagram of a receiver system.

The construction of the transmitted apparatus illustrated in FIG. 3 can now be explained. Those skilled in the art of digital data transmission will realize that more or less unending possibilities and variations in circuit design exist. As one concrete example however, it is assumed that data is assembled in a multi-register store 10, one register per row. All blocks other than block 9 have 24 row registers; block 9 has $3 \times 24$ row registers for pages 9*a*, 9*b* and 9*c*. Data is read out non-destructively from all registers in parallel with the pulses timed correctly to enter the latter half of line 13 and line 14 in the correct positions. This timing is established by a bit counter 11 responsive to a clock generator 12 and by a line counter 15 responsive to the television synchronising waveform.

Within each field, only the data from one register is accepted for transmission, the correct register being selected in accordance with the scheme of FIG. 1 by block gating 16 and row gating 17. The block gating is controlled by a ÷ 32 field counter 18 while the row gating is controlled by a ÷ 24 row counter 19 driven off the field counter 18. The row counter 19 provides a block cycle pulse every 15.36 seconds on line 20. In order to transmit pages 9*a*, *b* and *c* in cyclic succession further gating 21 is employed. For convenience the page is changed not exactly every minute but every four block cycles. Thus a ÷ 12 counter 22 counts down the block cycle pulses on line 20 and, during states 0 to 3 enables gates 23*a* selecting the block 9*a* registers, during states 4 to 7 enables gates 23*b* selecting the block 9*b* registers, and during states 8 to 11 enables gates 23*c* selecting the block 9*c* registers. These provisions cause 9*a* to be transmitted for 1 minute 1.44 seconds, then page 9*b* for 1 minute 1.44 seconds, then page 9*c* for 1 minute 1.44 seconds, and so on in cycle sequence. No special measures are necessary at the receiver in respect of these pages.

Data can be written in the registers for blocks 1 to 31 as and when required in any convenient way, e.g. from a keyboard. Data is entered in the block 32 registers rather differently. A large capacity block 32 store or input device 25, e.g. a punched tape reader, is activated every minute by a minute timer 26 driven off the clock generator 12 to read a fresh block of data into the block 32 registers.

Furthermore, block 32 gates 27 are interposed between the block 32 registers and the block gating 16 to establish the timing scheme shown in FIG. 2. To this end 2-cycle logic 28 is controlled jointly by the minute timer 26 and the row counter 19 so as to enable the gates 27 in response to the first block cycle pulse occurring on line 20 after a minute pulse has been received from the minute timer 26, and to disable the gates 27 two block cycle pulses later.

Address codes are assembled in an address register 29 consisting firstly of the two-character block address entered from counter 18 and the aforementioned special code for the first line of each block entered in response to the pulse on line 20. The time code (which is only of significance in block 32) is formed by a generator 30 controlled from the minute timer 26, and is also entered in the register 29. The contents of this register are timed out of the register 29 so as to appear correctly in the first part of line 13, such timing again being controlled from the counters 11 and 15.

The pulses forming the character codes (whether for the data or its address) emanating from row gating 17 and register 29 are in serial form. Up to this point it does not matter whether serial, parallel or series-parallel techniques are employed. The serial pulses are assembled and shaped conventionally in unit 33 and fed out to a mixer 34 where they are superimposed on lines 13 and 14 of the conventional television signal on line 35. The multiplexed output on line 36 is then passed for transmission in the usual way.

Figure 4:
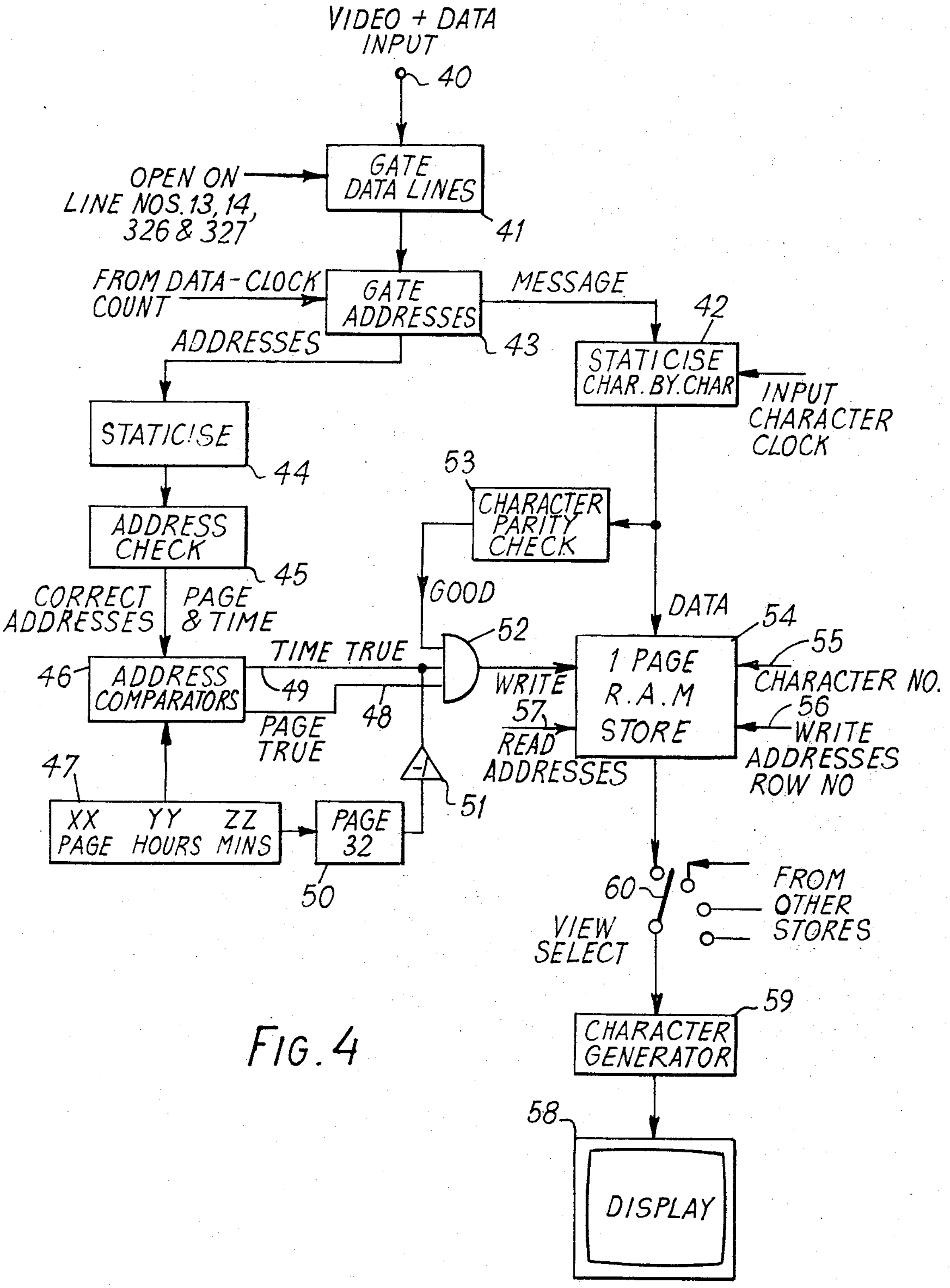

FIG. 4 shows the receiver system, omitting details of the conventional receiver circuits and the circuits which establish the correct timing for the various operations. The nature of the timing control will be apparent however from the description.

The incoming multiplexed signal on line 40 is applied to a gate 41 which is opened under control of a line counter to pass data lines 13 and 14 (and 326 and 327). The whole message, i.e. row of characters is fed to a character staticiser 42 timed by character rate clock pulses, namely a rate in the region of 25 times line rate. The address characters only are passed by a gate 43 to an address staticiser 44, which staticises all address characters, the gate 43 being timed by counting that part of the data clock cycle, i.e. the appropriate character rate clock pulses, which define the address-containing initial part of line 13.

The addresses are checked for compliance with predetermined format requirements by unit 45 and applied to an address comparator 46. The other input to this comparator is provided by a presettable register 47 on which the user can set up the desired page code XX and, in the case of page 32, the desired time address YY:ZZ. The comparator compares page address codes, and when a match occurs puts a logical 1 on line 48. It also compares time codes and, when a match occurs puts a logical 1 on line 49. This latter function must be over-ridden when any page other than 32 is selected. To this end, unit 50 recognises selection of page 32, and via an inverter 51, puts a permanent logical 1 on line 49 when page 32 is not selected.

A gate 52 is enabled when logical 1's exist on lines 48 and 49 and at the output of a character parity check circuit 53. When the gate 52 is enabled it applies a write signal to an addressed read/write store to enable the characters staticised in staticiser 42 to enter the store one by one.

A whole page of data is assembled in the store 54 by addressing the character positions on line 55 in response to a character pulse counter running synchronously with the apparance of characters in lines 13 and 14, and by addressing the rows on line 56 in response to a field counter whose counting cycle is correctly synchronised by the aforementioned beginning of page code.

The page of characters in the store 54 may be displayed while it is received or may be left in the store for display at some later time. This is of importance in the case of page 32 since the selected page can only be received at one particular minute of the day. The actual technique used for display forms no part of the present invention and can follow conventional data display practice. Briefly however, read addresses on line 57, correctly timed in relation to the scanning waveforms of the display device 58, read the character codes out non-destructively to a character generator 59 which generates the required video waveform for the display 58. A switch 60 enables data display to be effected from other stores like the store 54.

The transmitted data may be exclusively alphanumeric. However, it is also possible to transmit other data such as line drawings, in which case each "character" represents a segment of the line drawing.

I claim:

1. A television transmission system for broadcasting a television signal and comprising means for multiplexing with said television signal in at least one time slot different blocks of digitally coded data at different times of day, each of which blocks includes a code addressing the block and comprising a time code representing the time of day at which the block is transmitted.

2. A television transmission system according to claim 1, wherein the multiplexing means operate on a data block transmitting cycle occupying $q.p$ fields in which each of $q$ time slots is comprised within a different $p$ of the fields, $q$ and $p$ both being integers.

3. A television transmission systm according to claim 2, wherein the time slots are interlaced with each other in the said cycle.

4. A television transmission system according to claim 3, wherein the $s$th time slot is comprised within the fields $s, s+q, s+2q \ldots s+(p-1)q$ of the said cycle, where $s$ is an integer from 1 to $q$.

5. A television transmission system according to claim 2, wherein the $p$ fields in a cycle pertaining to any time slot are consecutive.

6. A television transmission system according to claim 2, wherein the digitally coded data constituting a data block is transmitted in $p$ sections, each occupying predetermined lines within the vertical blanking interval of a corresponding field.

7. A television transmission system according to claim 2, wherein a plurality of different data blocks are transmitted in cyclic sequence in the said one time slot and each of the different data blocks is transmitted each time within the cyclic sequence for a small number of consecutive data block transmitting cycles with a total duration of the order of magnitude of a minute.

8. A television transmission system according to claim 1, wherein a plurality of different data blocks are transmitted in cyclic sequence in the said one time slot.

9. A television transmission system according to claim 1, wherein the times of day of successive data blocks follow at regular intervals which are non-integral multiples of the duration of a data block transmitting cycle, and wherein the system is arranged to transmit each data block only within one or more data block transmitting cycles lying wholly within the interval corresponding to the time code for the data block.

10. A television transmission system according to claim 1, wherein each data block occupies a transmission time of the order of 1 minute.

11. A television transmission system according to claim 10, wherein the multiplexing means operate on a data block transmitting cycle occupying *q.p* fields in which each of *q* time slots is comprised within a different *p* of the fields, *q* and *p* being integers, and wherein each of the cyclic succession of data blocks is transmitted within each cycle of the cyclic succession during a small number of consecutive data block transmitting cycles.

12. A television receiver system for receiving a broadcast television signal, comprising means for extracting from a predetermined time slot blocks of digitally coded data multiplexed with the television signal, manually controllable means for presetting a block address representing a selected one of a succession of data blocks all transmitted within the predetermined time slot, the manually controllable means being arranged for presetting block addresses which are the times of day of transmission within the predetermined time slot of different data blocks, means for comparing with the preset address address codes in the data blocks which comprise time codes representing the times of day at which the blocks are transmitted, and means operative when a match is detected by the comparing means to cause the corresponding block of data to be recovered for display.

13. A television receiver system according to claim 12, wherein the manually controllable means are further arranged for presetting time slot addresses which correspond to different time slots, and comprising means for overriding the action of the comparing means when certain time slot addresses other than the address of the predetermined time slot are selected.

14. A television receiver system for receiving a broadcast television signal having multiplexed therewith in a plurality of time slots blocks of digitally coded data with the data blocks occupying a recurring data block transmitting cycle of *q.p* fields in which each of *q* time slots is comprised within a different *p* of the fields, *q* and *p* being integers, and one or more predetermined time slots has transmitted therein a succession of different data blocks, all data blocks including a time slot address and each data block in the or each predetermined time slot including a data block address, the system comprising a data block store, means for extracting the data blocks from the television signal, means for presetting a time slot address and a data block address, and means for gating an extracted data block into the data block store when, in the case of the or each predetermined time slot, there is a match between both the received time slot address and data block address and the preset time slot address and data block address and when, in the case of the remaining time slots, there is a match between only the received time slot address and the preset time slot address.

* * * * *